(12) United States Patent  (10) Patent No.: US 8,593,579 B2
Ishino  (45) Date of Patent: Nov. 26, 2013

(54) PROJECTION DISPLAY

(75) Inventor: Hirohisa Ishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 12/426,619

(22) Filed: Apr. 20, 2009

(65) Prior Publication Data

US 2009/0262261 A1 Oct. 22, 2009

(30) Foreign Application Priority Data

Apr. 21, 2008 (JP) ................. P2008-110664

(51) Int. Cl.
*H04N 5/74* (2006.01)
*G02F 1/00* (2006.01)

(52) U.S. Cl.
USPC ............. 348/751; 348/752; 353/20; 353/31

(58) Field of Classification Search
USPC .......... 348/744, 758, 750, 752; 359/618, 267; 353/20, 30, 33, 31, 34
See application file for complete search history.

(56) References Cited

U.S. PATENT DOCUMENTS

| | | | | |
|---|---|---|---|---|
| 5,978,142 | A * | 11/1999 | Blackham et al. | 359/618 |
| 2005/0052346 | A1 * | 3/2005 | Koyama | 345/32 |
| 2005/0270618 | A1 * | 12/2005 | Uchiyama et al. | 359/249 |

FOREIGN PATENT DOCUMENTS

| | | | |
|---|---|---|---|
| JP | 2001-100689 | | 4/2001 |
| JP | 2003-149730 | | 5/2003 |
| JP | 2005-196034 | | 7/2005 |
| JP | 2005-208573 | | 8/2005 |
| JP | 2005-234539 | | 9/2005 |
| JP | 2006-053214 | * | 2/2006 |
| JP | 2006-53214 | * | 2/2006 |
| JP | 2006-113193 | | 4/2006 |
| JP | 2007-199192 | | 8/2007 |
| JP | 2007-293140 | | 11/2007 |

OTHER PUBLICATIONS

English-language translation of the 1st Office Action issued by the State Intellectual Property Office (SIPO) on Mar. 1, 2010 corresponding to Japanese Patent Application No. 2007-293140.
Japanese Office Action No. 2008-110664, issued Nov. 15, 2012, 2 pages.
Japanese Office Action No. 2008-110664, issued Jul. 24, 2012, 6 pages.

* cited by examiner

*Primary Examiner* — Michael Lee
(74) *Attorney, Agent, or Firm* — Finnegan Henderson Farabow Garrett & Dunner LLP

(57) ABSTRACT

The present invention provides a projection display capable of realizing high contrast in a display image plane. The projection display includes a light source; a first light modulator modulating light from the light source on the basis of an input image signal, and generating a first image light; a second light modulator modulating the first image light on the basis of the image signal, and generating a second image light; and a projection lens projecting the second image light generated with the second light modulator.

12 Claims, 9 Drawing Sheets

PROJECTION DISPLAY

BACKGROUND OF THE INVENTION

1. Field of the Invention

The present invention relates to a projection display projecting and displaying image.

2. Description of the Related Art

In a projection display, image is generated by modulating light from a light source on the basis of image signal by using a light modulator such as a liquid crystal display (LCD), and display is performed by projecting the generated image on a screen or the like. In general, it is desired to realize high contrast in a projection display, and there has been proposed a method to improve the contrast by, for example, providing a polarizing beam filter (for example, Japanese Unexamined Patent Publication No. 2006-53214).

It has also been attempted to improve the contrast by providing, between a light source and a light modulator, an aperture controllable in synchronization with input image signal, and chronologically changing a level of light intensity in display image.

SUMMARY OF THE INVENTION

However, the method of using the above-described aperture improves only the chronological contrast of a whole image. It is difficult to improve the contrast in one sheet of image plane.

In view of the foregoing, it is desirable to provide a projection display capable of realizing high contrast in a display image plane.

According to an embodiment of the present invention, there is provided a projection display including a light source; a first light modulator modulating light from the light source on the basis of an input image signal, and generating a first image light; a second light modulator modulating the first image light on the basis of the image signal, and generating a second image light; and a projection lens projecting the second image light generated with the second light modulator.

In the projection display according to the embodiment of the present invention, the light from the light source is modulated on the basis of the image signal with the first light modulator, and the first image light is generated. The first image light is modulated with the second light modulator, and the second image light is generated where a light intensity distribution of the first image light is superimposed. The generated second image light is projected with the projection lens, and thereby display is performed.

At this time, it is preferable that the first image light and the second image light form images substantially identical to each other, and the first light modulator and the second light modulator are driven in synchronization on the image signal. That is, it is preferable that the first image light and the second image light have light intensity distributions identical to each other in a plane.

According to the embodiment of the present invention, the projection display includes the first light modulator modulating light from the light source on the basis of an image signal, and generating the first image light; and the second light modulator modulating the first image light, and generating the second image light. Thus, contrast of image light to be finally displayed is obtained by multiplying original contrast of the second light modulator by contrast of the first light modulator. Therefore, high contrast is realized in a display image plane.

Other and further objects, features and advantages of the invention will appear more fully from the following description.

DETAILED DESCRIPTION OF THE PREFERRED EMBODIMENT

A preferred embodiment of the present invention will be described in detail with reference to the accompanying drawings.

Figure 1:
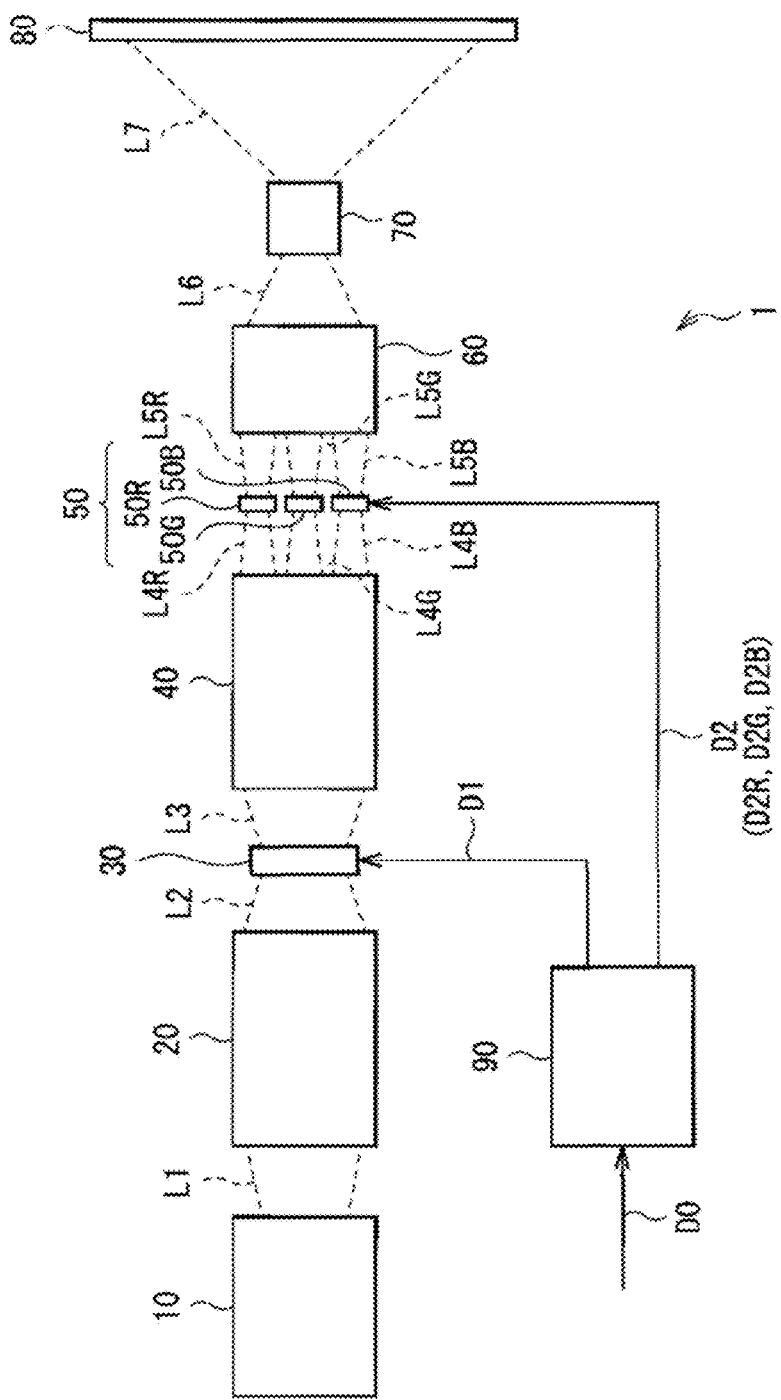
FIG. 1 illustrates the schematic configuration of a projection display according to an embodiment of the present invention.

FIG. 1 illustrates the schematic configuration of a projection display 1 according to an embodiment of the present invention. The projection display 1 includes a light source 10, an illumination optical system 20, an illumination light modulator (first light modulator) 30, a relay/color separation optical system 40, a display light modulator (second light modulator) 50, a synthesizing optical system 60, a projection lens 70, and a signal processing circuit 90.

The light source 10 emits, for example, white light. The illumination optical system 20 optimizes a shape, light intensity distribution, polarization state, and the like of a light flux L1 from the light source 10.

The illumination light modulator 30 two-dimensionally modulates a light flux L2 from the illumination optical system 20 on the basis of a monochrome image signal D1 to be described later, and thereby generates an image light L3 as illumination light of the display light modulator 50. The illumination light modulator 30 is arranged in a position optically conjugated to the display light modulator 50, or arranged in the vicinity of this position. A plurality of pixels are two-dimensionally arranged in the illumination light modulator 30, and the number of the pixels in the illumination light modulator 30 is equal to or less than the number of pixels in the display light modulator 50. The illumination light modulator 30 is driven in synchronization with the display light modulator 50 based on an input image signal D0, irrespective of the number of pixels in the illumination light modulator 30, and image substantially identical to images formed by image lights L5R, L5G, and L5B (to be described later) generated in the display light modulator 50 is formed.

The relay/color separation optical system 40 separates the white image light L3 from the illumination light modulator 30 into color lights L4R, L4G, and L4B of three colors red (R), green (G), and blue (B), and guides the color lights to a red light modulator 50R, a green light modulator 50G, and a blue color modulator 50B, respectively. With the relay/color separation optical system 40, the illumination light modulator 30 and the display light modulator 50 are arranged in the positions substantially conjugated with each other.

The display light modulator 50 includes, for example, the red light modulator 50R, the green light modulator 50G, and the blue light modulator SOB, and generates display image lights L5R, L5G, and L5B for the three color lights L4R, L4G, and L4B, respectively, on the basis of a primary color image signal D2 (a red image signal D2R, a green image signal D2G, and a blue image signal D2B) which will be described later.

The synthesizing optical system 60 is configured with a color synthesizing prism such as a cross-dichroic prism, and synthesizes the three color image lights L5R, L5G, and L5B. The projection lens 70 expands and projects an image light L6 synthesized with the synthesizing optical system 60 on the screen 80.

The signal processing circuit 90 generates the monochrome image signal D1 and the primary color image signal D2 (D2R, D2G, and D2B) on the basis of the input image signal D0. Then, the signal processing circuit 90 outputs the monochrome image signal D1 to the illumination light modulator 30, and outputs the primary color image signal D2 to the display light modulator 50. The monochrome image signal D1 is composed of a luminance component (Y) of the image signal D0, and the primary color image signal D2 is composed of a red image signal (D2R), a green image signal (D2G), and a blue image signal (D2B) corresponding to the image signal D0. Hereinafter, the components of such a projection display 1 will be specifically described.

Figure 2:
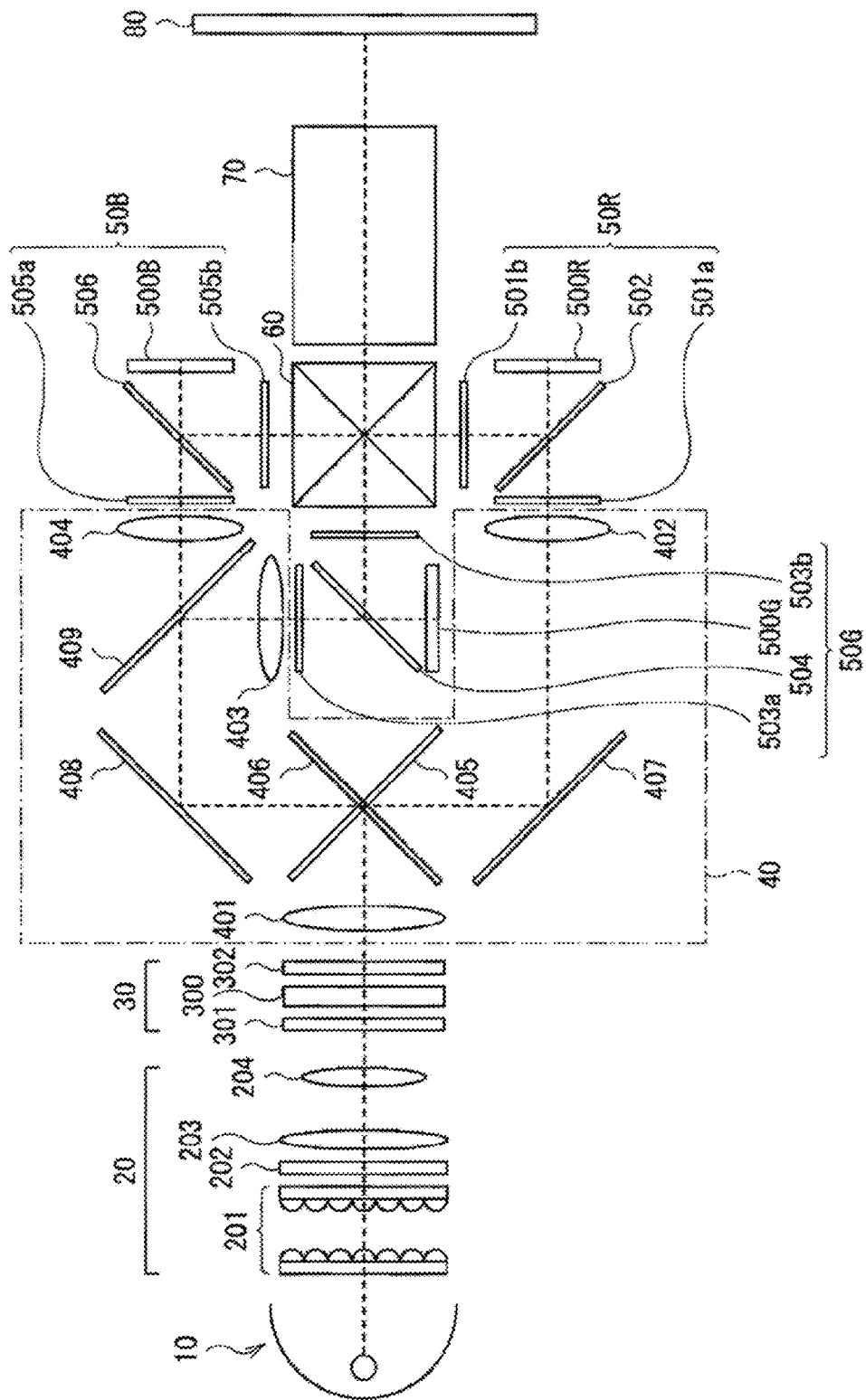
FIG. 2 illustrates the specific configuration of the projection display shown in FIG. 1

FIG. 2 illustrates a specific example of the projection display 1 of the embodiment.

The light source 10 includes, for example, a light-emitting body and a concave mirror (reflecting mirror). As the light-emitting body, a lamp having a continuous light emission spectrum over an entire wavelength region of visible light, for example, an ultra-high pressure mercury lamp such as a UHP lamp is used. Alternatively, a metal halide lamp, a high pressure mercury lamp, a high pressure sodium lamp, and a fluorescent lamp are also may be used. It is desirable that the concave mirror have a shape with condensing efficiency as high as possible, and, for example, an ellipsoidal mirror (ellipsoidal REF) and a parabolic mirror (parabolic REF) be used.

The illumination optical system 20 includes, for example, a fry eye lens 201, a PS converter 202, and condenser lenses 203 and 204 arranged in this order from the light source 10 side. The fray eye lens 201 diffuses the light flux from the light source 10, and uniformizes a light intensity distribution in a plane. The light flux having the light intensity distribution uniformized with the fry eye lens 201 is adjusted in a polarization direction with the PS converter 202, and condensed toward the illumination light modulator 30 with the condenser lenses 203 and 204.

The illumination light modulator 30 is, for example, provided with polarizing plates 301 and 302 on a light incident side and a light emitting side of a transmissive liquid crystal panel 300, respectively. The liquid crystal panel 300 has the configuration where a plurality of pixels are two-dimensionally arranged, and a liquid crystal layer is sealed between a pair of substrates. When driving the liquid crystal panel 300, voltage according to the monochrome image signal D1 is applied between the substrates for each pixel, and transmittance is controlled. Thereby, the illumination image light two-dimensionally modulated is generated.

The relay/color separation optical system 40 includes relay lenses 401 to 404, and mirrors 405 to 409. As the mirrors 405 to 409, total reflection mirrors or dichroic mirrors selectively transmitting or reflecting color lights are used. Instead of the dichroic mirrors, color separation prisms may be used.

The red light modulator 50R, the green light modulator 50G, and the blue light modulator 50B as being reflective light modulators modulate and reflect the light from the relay/color separation optical system 40 side on the basis of each of the color image signals. This results in that an image light is emitted to the same side as the light incident side. The red light modulator 50R includes a reflective liquid crystal panel 500R such as an LCOS (liquid crystal on silicon) panel. On the light incident side (on the relay/color separation optical system 40 side) and the light emitting side (the synthesizing optical system 60 side) of the red light modulator 50R, polarizing plates 501a and 501b are provided, respectively. On a light path between such a liquid crystal panel 500R and the polarizing plates 501a and 501b, a wire-grid polarizing plate 502 forming an angle of 45° with respect to a light axis is arranged. The wire-grid polarizing plate 502 transmits one of polarization components (for example, s-polarized light), and reflects the other of the polarization components (for example, p-polarized light).

Similar to the red light modulator 50R, the green light modulator 50G is configured with a reflective liquid crystal panel 500G, polarizing plates 503a and 503b, and a wire-grid polarizing plate 504. The blue light modulator 50B is configured with a reflective liquid crystal panel 500B, polarizing plates 505a and 505b, and a wire grid polarizing plate 506.

Next, operations and effects of the projection display 1 according to the embodiment will be described with reference to FIGS. 1 and 2.

In the projection display 1, the light flux L1 emitted from the light source 10 is changed to a light flux L2 having a uniform polarization direction by passing through the illumination optical system 20. Then, the light flux L2 enters the illumination light modulator 30. Meanwhile, when the image signal D0 is input to the signal processing circuit 90, the image signal D0 is separated into the monochrome image signal D1 and the primary color image signal D2. The white image signal D1 is output to the illumination light modulator 30, and the primary color image signal D2 is output to the display light modulator 50. At this time, the primary color image signal D2 is separated into three color components of the red image signal D2R, the green image signal D2G, and the blue image signal D2B, which are output to the red light modulator 50R, the green light modulator 5G, and the blue light modulator 50B, respectively. The illumination light modulator 30 and the display light modulator 50 are driven in synchronization with respect to the image signal D0 input to the signal processing circuit 90, and images substantially identical to each other are formed in the illumination light modulator 30 and the display light modulator 50.

In the illumination light modulator 30, the light flux L2 is two-dimensionally modulated on the basis of the monochrome image signal D1 input from the signal processing circuit 90. Thereby, the image light L3 corresponding to the monochrome image (gray-scale image) of the image signal D0 is generated. The generated image light L3 is separated into three color lights L4R, L4G, and L4B by passing through the relay/color separation optical system 40. The three color lights L4R, L4G, and L4B enter the red light modulator 50R, the green light modulator 50G, and the blue light modulator 50B, respectively.

As described above, in the red light modulator 50R, the green light modulator 50G, and the blue light modulator 50B, the lights L4R, L4G, and L4B are modulated for each color on the basis of the red image signal D2R, the green image signal D2G, and the blue image signal D2B input from the signal processing circuit 90, and three color image lights for display L5R, L5G, and L5B are generated.

At this time, in the red light modulator 50R, for example, in the case where the image light L4R entering from the relay/color separation optical system 40 side passes through the polarizing plate 501a on the light incident side as s-polarized light, the image light L4R transmits the wire-grid polarizing plate 502 as it is, and enters the liquid crystal panel 500R. The polarization direction of the image light L5R generated in the liquid crystal panel 500R rotates by an angle of 90 degrees, and the image light L5R is emitted as p-polarized light. Thus, the image light L5R emitted from the liquid crystal panel 500R is reflected on the wire-grid polarizing plate 502, passes through the polarizing plate 501b, and enters the synthesizing optical system 60. In the green light modulator 50G and the blue light modulator 50B, the light path is also changed with the wire-grid polarizing plates 504 and 506 in the same way as the red light modulator 50R, and the image lights L5G and L5B enter the synthesizing optical system 60. By using such wire-grid polarizing plates, light loss caused by reflection or transmission is suppressed, and this is advantageous to improve the contrast.

The image lights L5R, L5G, and L5B entering the synthesizing optical system 60 are synthesized in the synthesizing optical system 60 and changed to an image light L6. The image light L6 is expanded and projected on the screen 80 with the projection lens 70.

As described above, in the embodiment, the illumination light modulator 30 is provided between the light source 10 and the display light modulator 50 generating the display image on the basis of the primary color image signal D2, and the light from the light source is modulated in the illumination light modulator 30 on the basis of the monochrome image signal D1. Thus, the monochrome image of the image signal D0, that is, the image light L3 of the extracted luminance component becomes the illumination light for the display light modulator 50. Specifically, the image light L3 is separated into each of the colors with the relay/color separation optical system 40, and the generated image lights as the image lights L4R, L4G, and L4B illuminate the color light modulators of the display light modulator 50, respectively. Thus, in the display light modulator 50, it is possible that the images lights L5R, L5G, and L5B are generated while superimposing the light intensity distributions of the image light L3 (image lights L4R, L4G, and L4B). Thereby, the contrast of the image light L6 (L7) to be finally displayed is calculated by multiplying the original contrast of the display light modulator 50 by the contrast of the illumination light modulator 30. Therefore, the high contrast is realized in a display image plane.

For example, in the case where the contrast of the display light modulator 50 (50R, 50G, and 50B) is 500:1, and the contrast of the illumination light modulator 30 is also 500:1, the contrast of the whole system is calculated as 500×500=250000, that is, 250000:1. This means that the 500 times contrast improvement is expected. Here, the contrast of the illumination light modulator 30 and the original contrast of the display light modulator 50 may be or may not be equal to each other.

In the case where the illumination light modulator 30 is arranged in the position optically conjugated to the display light modulator 50, and the number of pixels in the illumination light modulator 30 is equal to that of pixels in the display light modulator 50, grooves between the pixels in the display light modulator 30 and those between the pixels in the display light modulator 50 just overlie each other, and the grooves between the pixels in the illumination light modulator 30 are hardly imaged on the image light L5. However, it is actually difficult to form a perfectly conjugated relationship in principle, and there is a risk that the grooves between the pixels are imaged on the image light L5. For this reason, the number of the pixels in the illumination light modulator 30 is set equal to or less than that of the pixels in the display light modulator 50, and thereby it is suppressed that the grooves between the pixels in the illumination light modulator 30 are imaged on the display light modulator 50.

Alternatively, the illumination light modulator 30 may be arranged in the vicinity of the position optically conjugated to the display light modulator 50. With such a configuration, it is possible that the grooves between the pixels in the illumination light modulator 30 are blurred, and the influence of the grooves imaged on the display light modulator 50 is reduced.

Alternatively, a light diffusion layer may be provided on the light emitting side of the illumination light modulator 50. With such a configuration, it is also possible that the grooves between the pixels in the illumination light modulator 30 are blurred. The light diffusion layer may be arranged on the light incident side or the light emitting side of the polarizing plate 302 of the illumination light modulator 30.

Next, a modification of the present invention will be described with reference to the figures. Hereinafter, same reference numerals as the projection display 1 according to the above embodiment have been used to indicate substantially identical components, thereby the descriptions appropriately omitted.

First Modification

Figure 3:
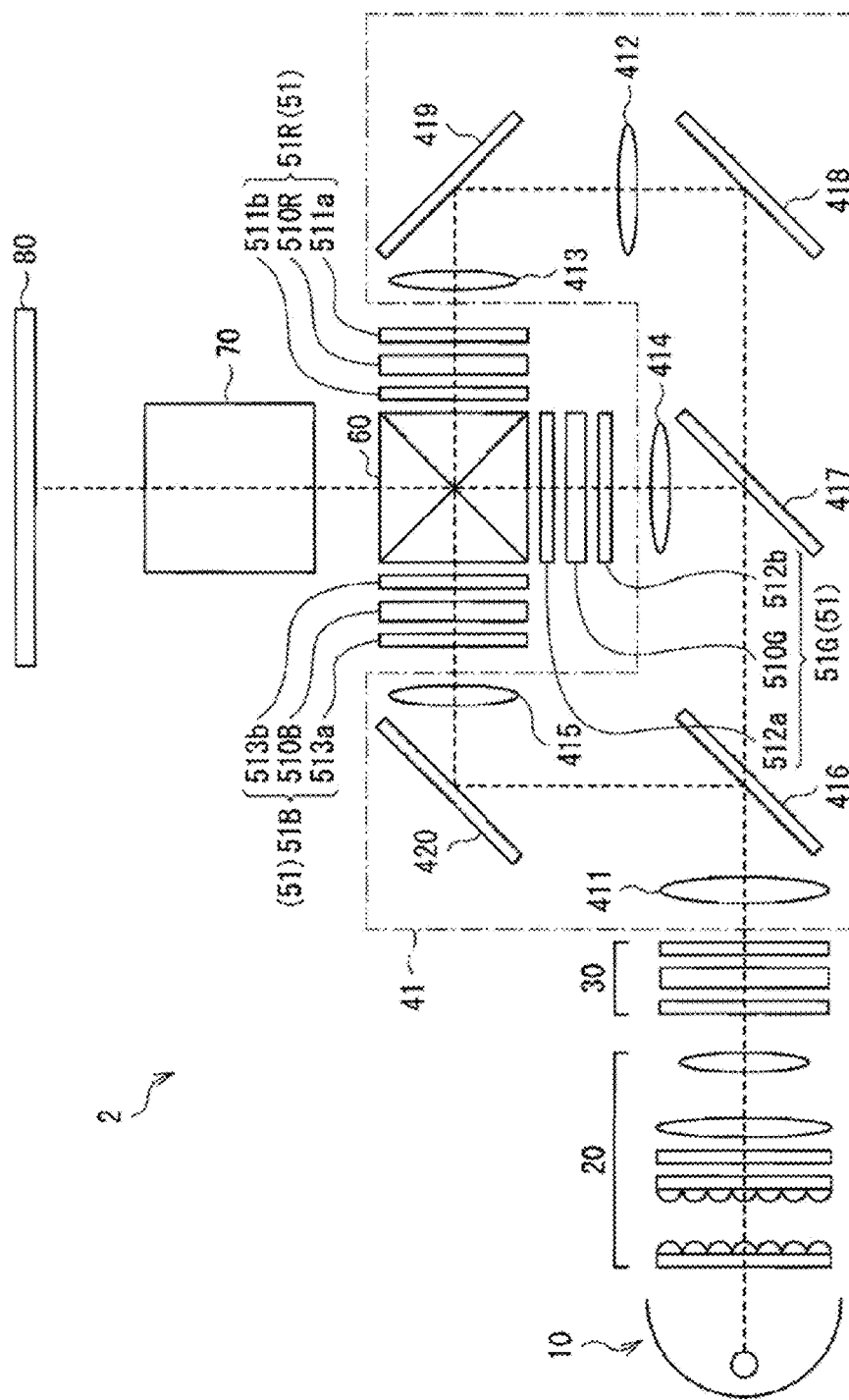
FIG. 3 illustrates the whole configuration of a projection display according to a first modification of the present invention.

FIG. 3 illustrates the whole configuration of a projection display 2 according to a first modification. The projection display 2 has the same configuration as the above projection display 1 except the configurations of a relay/color separation optical system 41 and a display light modulator 51.

The relay/color separation optical system 41 includes relay lenses 411 to 415, and mirrors 416 to 420. As the mirrors 416 to 420, total reflection mirrors or dichroic mirrors selectively transmitting or reflecting color lights are used. Instead of the dichroic mirrors, color separation prisms may be used.

The display light modulator 51 includes of a red light modulator 51R, a green light modulator 51G, and a blue light modulator 51B. The red light modulator 51R, the green light modulator 51G, and the blue light modulator 51B as being transmissive light modulators modulate and transmit the light from the relay/color separation optical system 41 side on the basis of each of the color image signals, and thereby emit image light. The red light modulator 51R has a transmissive liquid crystal panel 501R. On the light incident side and the light emitting side of the red light modulator 51R, polarizing plates 511a and 511b are provided, respectively.

In the modification, the illumination light modulator 30 is also arranged in the position optically conjugated to the display light modulator 51, or arranged in the vicinity of that position. The number of pixels in the illumination light modulator 30 is equal to or less than that of pixels in the display light modulator 51.

As described above, the transmissive light modulators are used for the display light modulator 51. Even with such a configuration, the same effects as the projection display 1 are obtained.

Second Modification

Figure 4:
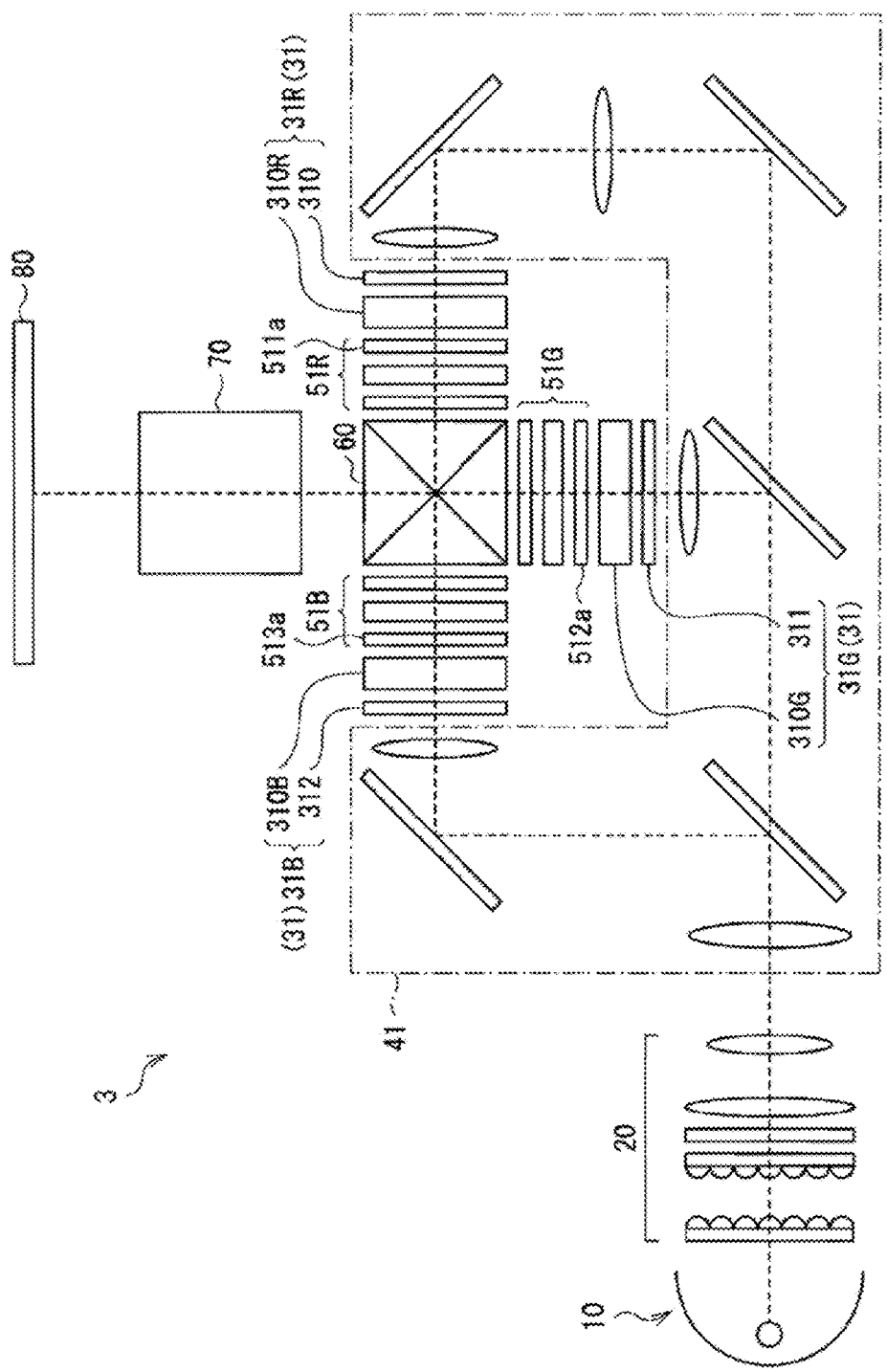
FIG. 4 illustrates the whole configuration of a projection display according to a second modification of the present invention.

FIG. 4 illustrates the whole configuration of a projection display 3 according to a second modification. The projection display 3 has the same configuration as the above projection display 1 except that an illumination light modulator 31 is arranged close to a display light modulator 51.

The illumination light modulator 31 includes a red light modulator 31R, a green light modulator 31G, and a blue light modulator 31B. The red light modulator 31R, the green light modulator 31G, and the blue light modulator 31B are arranged close to a red light modulator 51R, a green light modulator 51B, and a blue light modulator 51B as the display light modulator 51, respectively. That is, in the second modification, after a white light flux passing through an illumination optical system 20 is separated into three color lights in the relay/color separation optical system 41, illumination image light is generated for each color.

With such a close arrangement, a polarizing plate on the light emitting side of the illumination light modulator 31 and a polarizing plate on the light incident side of the display light modulator 51 are common. For example, a polarizing plate 511a on the light incident side of the red light modulator 51R also serves as a polarizing plate on the light emitting side of the red light modulator 31R.

Figure 5A:
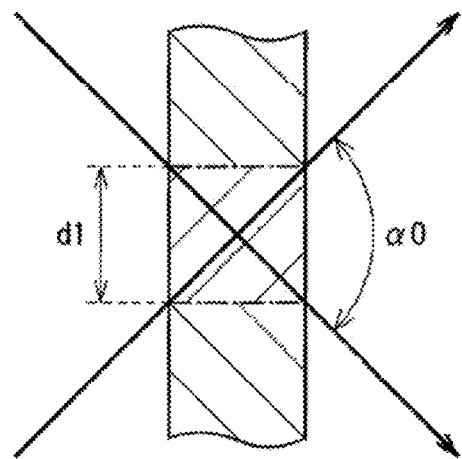
FIGS. 5A to 5C are schematic views for explaining close arrangement.
Figure 5B:
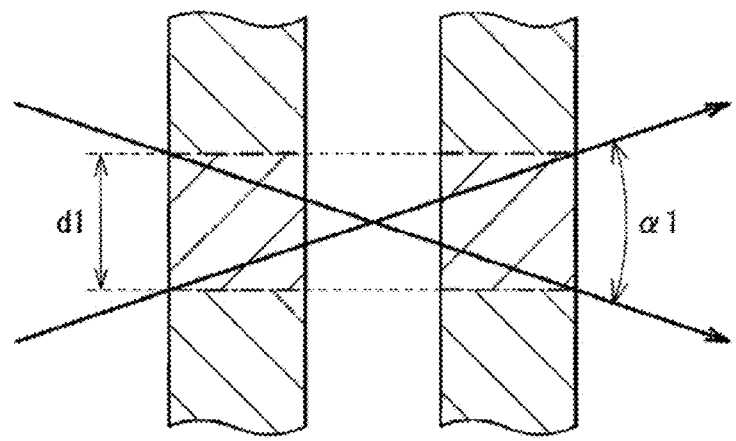
Figure 5C:
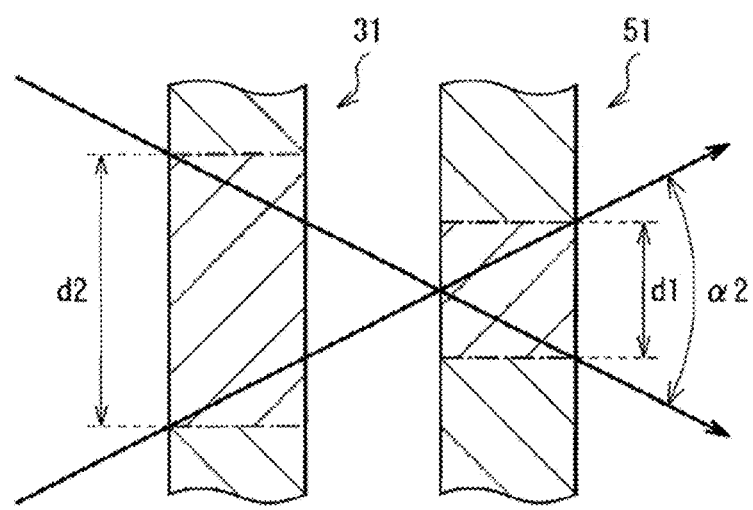

Moreover, it is preferable that the number of pixels in the illumination light modulator 31 be less than that of pixels in the display light modulator 51. For example, as shown in FIG. 5A, a divergence angle of light transmitting a pixel with a width d1 in one light modulator is α0. As shown in FIG. 5B, when two light modulators are closely arranged, a light divergence angle α1 becomes small. Thus, as shown in FIG. 5C, if the number of pixels in the illumination light modulator 31 is less than that of pixels in the display light modulator 51, a pixel width d2 of the illumination light modulator 31 becomes large, and this results in that a light divergence angle α2 becomes large.

Third Modification

Figure 6:
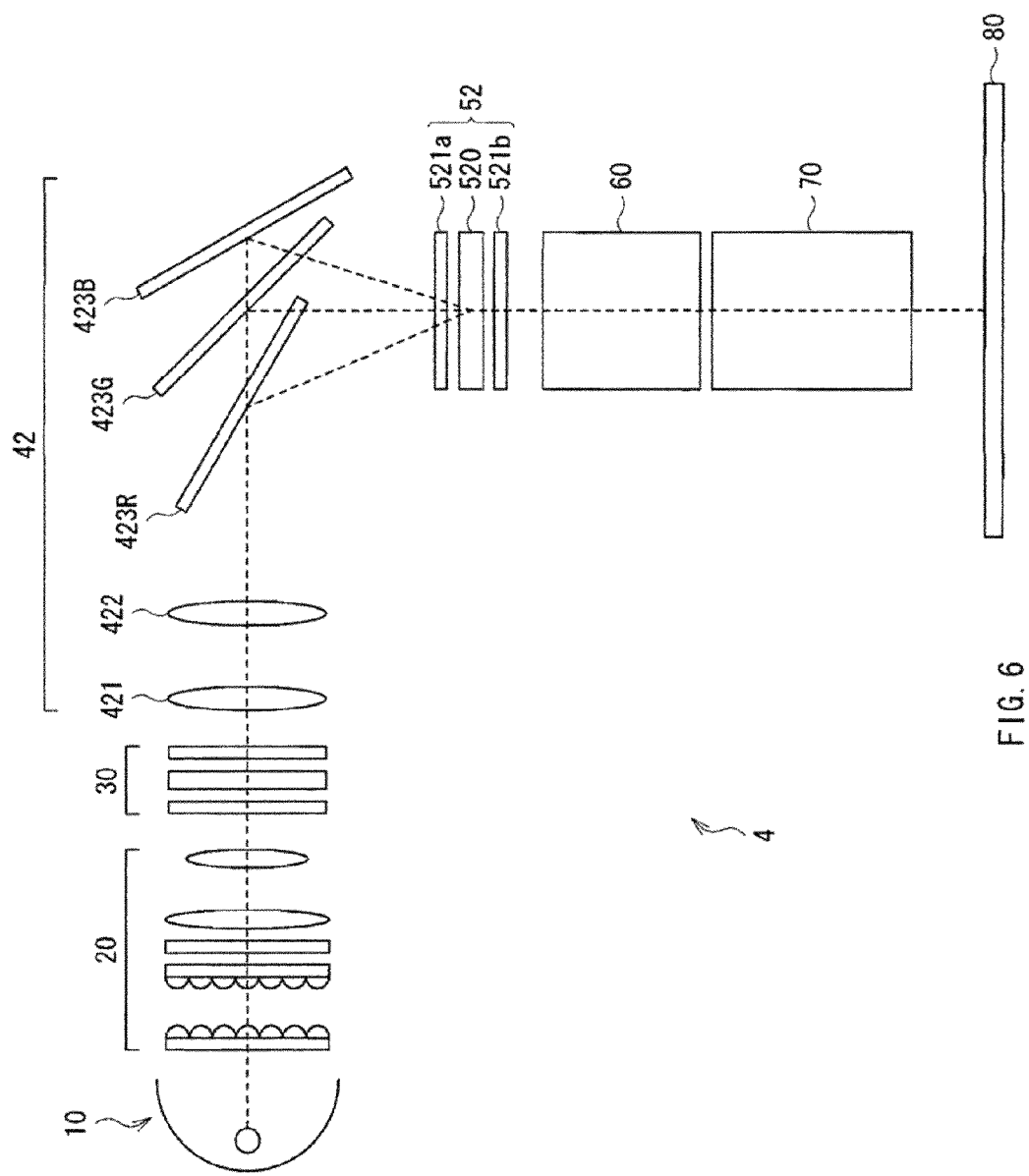
FIG. 6 illustrates the whole configuration of a projection display according to a third modification of the present invention.

FIG. 6 illustrates the whole configuration of a projection display 4 according to a third modification. The projection display 4 has the same configuration as the above projection display 1 except the configurations of a relay/color separation optical system 42 and a display light modulator 52. In the projection display 4, light from a light source 10 is modulated with an illumination light modulator 30, and then separated into three color lights with the relay/color separation optical system 42. The separated color lights are modulated with one display light modulator 52, and thereby display image light is generated.

The relay/color separation optical system 42 is configured by aligning relay lenses 421 and 422, and dichroic mirrors 423R, 423G, and 423B selectively reflecting color lights. The dichroic mirrors 423R, 423G, and 423B are arranged at angles different from one another on a light axis, and red light, green light, and blue light enter the display light modulator 52 at angles different from one another with the dichroic mirrors 423R, 423G, and 423B, respectively.

Figure 7:
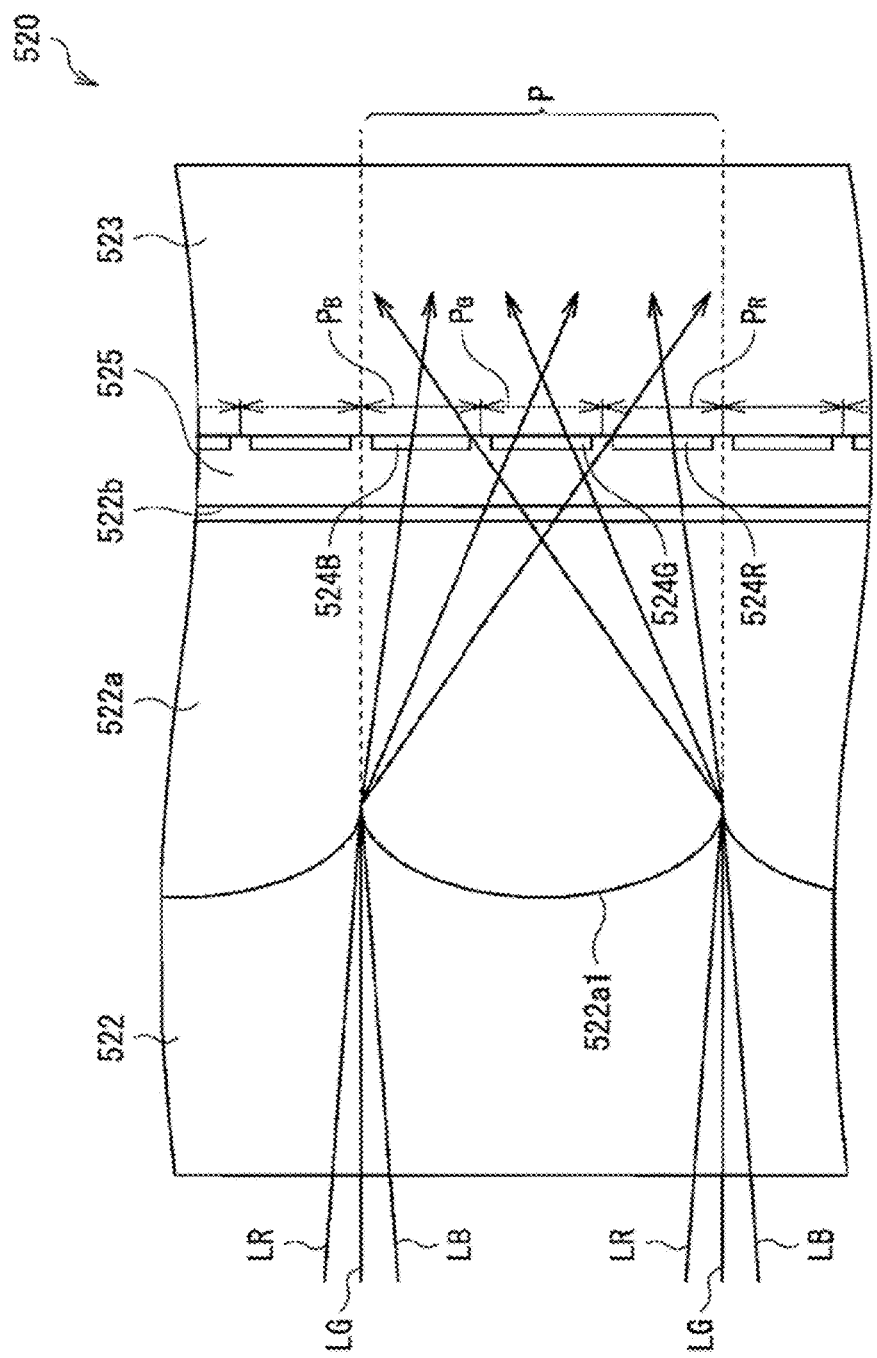
FIG. 7 illustrates the cross-sectional configuration of a liquid crystal panel shown in FIG. 6.

The display light modulator 52 includes a transmissive liquid crystal panel 520. On the light incident side and the light emitting side of the display light modulator 52, polarizing plates 521a and 521b are provided, respectively. FIG. 7 illustrates the detailed configuration of the liquid crystal panel 520. The liquid crystal panel 520 has a plurality of display units P, and the display unit P includes three pixels of a red displaying pixel $P_R$, a green displaying pixel $P_G$, and a blue displaying pixel $P_B$. The liquid crystal panel 520 has the configuration where a liquid crystal layer 525 is sealed between a pair of substrates facing each other, for example, a TFT (thin Film transistor) substrate 523 (substrate on the light emitting side) including a pixel driving circuit (not shown in the figure), and a facing substrate 522 (substrate on the light incident side). The TFT substrate 523 includes pixel electrodes 524R, 524G, and 524B for each pixel. For example, the liquid crystal layer 525 is configured with a liquid crystal material such as nematic liquid crystal, and a drive mode such as VA (vertical alignment) mode and TN (twisted nematic) mode are used. The facing electrode 522 includes a microlens array 522a, and a facing electrode 522b. In the microlens array 522a, a plurality of microlenses 522a1 are two-dimensionally arranged, and a display unit P is allocated to each microlens 522a1.

With such a configuration, the microlens array 522a is provided on the facing substrate 522 side, and three color lights LR, LG, and LB enter the microlens array 522a at angles different from one another. Thus, the three color lights LR, LG, and LB are distributed to the pixels $P_R$, $P_G$, and $P_B$ and condensed for each color light, respectively. Thereby, the three color image lights are generated, and emitted to a synthesizing optical system 60.

In this way, a plurality of display illumination light modulators 52 are not necessarily provided for each color, and it is also acceptable that one display illumination light modulator 52 be provided. In this case, as described above, if the light is separated into the three color lights in the relay/color separation optical system 42, and the three color lights enter the display light modulator 52 having a predetermined configuration at angles different from one another, full color display with a so-called single plate configuration is realized.

Fourth Modification

Figure 8:
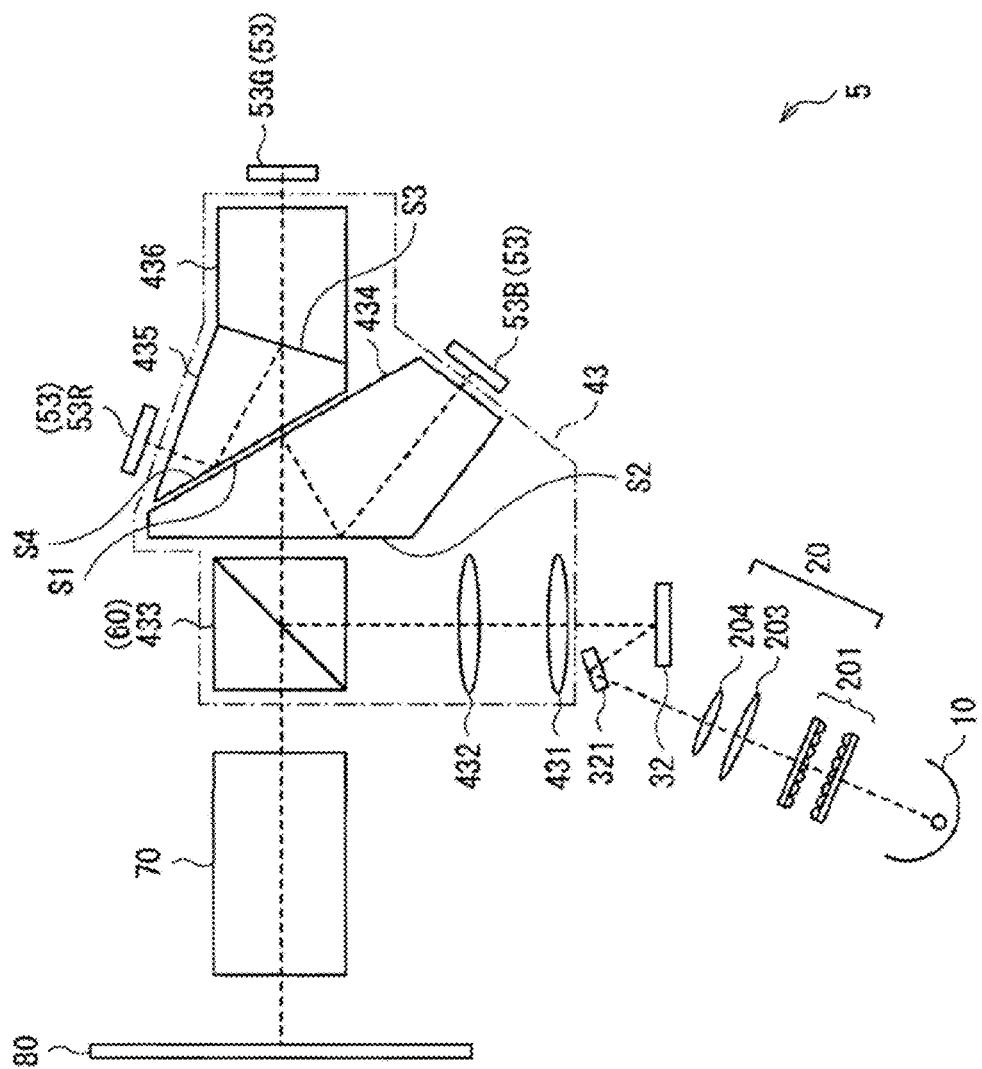
FIG. 8 illustrates the whole configuration of a projection display according to a fourth modification of the present invention.

FIG. 8 illustrates the whole configuration of a projection display 5 according to a fourth modification. The projection display 5 has the same configuration as the above projection display 1 except the configurations of a relay/color separation optical system 43 and that a micromirror device is used for an illumination light modulator and for a display light modulator 53. In the micromirror device used in the fourth modification, a plurality of micromirrors are two-dimensionally arranged. The micromirror device is a reflective light modulator, that is, a so-called DMD (digital mirror device). The frequency of turning on/off each micromirror is switched by applying voltage according to an image signal, and thereby a light reflecting region is two-dimensionally controlled and gradation display is performed.

The micromirror device (illumination light modulator) 32 generates an illumination image light by modulating the light emitted from an illumination optical system 20 on the basis of the above-described monochrome signal D1. A light path of the light from the illumination optical system 20 is changed with a total reflection mirror 321, and the light enters the micromirror device 32. Unlike the above-described case where the liquid crystal panel is used, since it is unnecessary to separate a polarization component, it is acceptable that no PS converter 202 be provided in the illumination optical system 20.

The relay/color separation optical system 43 is configured by arranging relay lenses 431 and 432, and prisms 433 to 436. With the prisms 433 to 436, the light (illumination image light) from the micromirror device 32 is separated into each of color lights, and the color lights enter micromirror devices 53R, 53G, and 53B (to be described later), respectively. The color lights (display image lights) emitted from micromirror devices 53R, 53G, and 53B are collected on the same light path and synthesized.

Specifically, the light path of the light passing through the relay lenses 431 and 432 is changed in the prism 433, and the light enters the prism 434. Blue reflection filters are formed on interfaces S1 and S2 of the prism 434. Blue light is reflected on the interfaces S1 and S2, and enters the micromirror 53B. Red light and green light transmitting the interfaces S1 and S2 of the prism 434 enter the prism 435. Red reflection filters are formed on interfaces S3 and S4 of the prism 435. The red light is reflected on the interfaces S3 and S4, and enters the micromirror device 53R. The green light transmitting the interfaces S3 and S4 of the prism 435 passes through the prism 436, and enters the micromirror device 53G. The color lights emitted from each micromirror device pass through the same path as when the color lights enter, are guided to the prism 433, and are synthesized in the prism 433. In the fourth embodiment, the prism 433 also serves as a synthesizing optical system 60.

The display light modulator 53 include the micromirror devices 53R, 53G, and 53B provided for red, green, and blue color lights, respectively. As described above, the three color lights separated with the prisms 433 to 436 are modulated in the micromirror devices 53R, 53G, and 53B, respectively, on the basis of a primary color image signal D2 (D2R, D2G, and D2B), and display image light is generated.

In this way, the illumination light modulator and the display light modulator are not limited to the above-described liquid crystal display device, and the micromirror device may also be used instead. Even in this case, the contrast of display image is also obtained as a product of the contrast of the micromirror device 32 for illumination and the contrast of each of the micromirrors 53R, 53G, and 53B for display. Therefore, same effects as the above-described projection display 1 are obtained.

Figure 9:
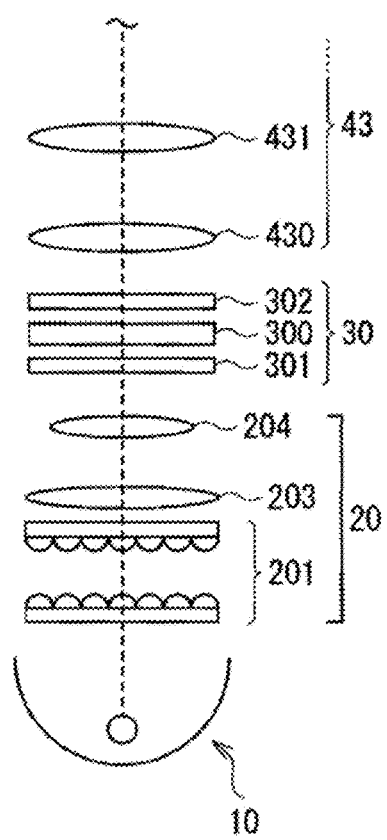
FIG. 9 is a view illustrating another example of the projection display shown in FIG. 8.

In the fourth modification, although the example where both of the illumination light modulator and the display light modulator are configured with the micromirror devices is described, the present invention is not limited to this. For example, as shown in FIG. 9, a combination of a liquid crystal display device having the above-described liquid crystal panel 300 as an illumination light modulator 30, a relay/color separation optical system 43, and a display light modulator 53 may be used. In this case, since the liquid crystal panel 300 is transmissive, it is unnecessary to arrange the above-described total reflection mirror 321 between an illumination optical system 20 and the illumination light modulator 30. Alternatively, an illumination light modulator may be configured with a micromirror device 32, and a reflective liquid crystal display device such as LCOS may be used as a display light modulator.

Although the present invention is described with the embodiment and the modifications, it is not limited to those and various modifications are possible. For example, in the embodiment, the monochrome image signal D1 as a luminance component and the primary color image signal D2 are generated on the basis of the image signal D0 input to the signal processing circuit 90. The monochrome image signal D1 is output to the illumination light modulator, and the primary color image signal D2 is output to the display light modulator. However, it is not to limited to this, and the image signal input to the illumination light modulator may include primary color components (Cb and Cr), or the image signal input to the display light modulator may include an illumination component (Y).

It is acceptable that the modulation be performed on the basis of the monochrome image signal D1 itself extracted from the image signal D0, users dynamically perform the light intensity modulation on the monochrome image signal D1, or the light intensity modulation be automatically performed in accordance with picture of the display image. Thereby, the contrast is freely variable.

In the embodiment, although the example where the lamp is used as the light source 10 is described, the present invention is not limited to this. Other light sources such as a laser diode and an LED (light emitting diode) may be used.

In the embodiment, although the example where one white light source is provided as the light source 10 is described, the present invention is not limited to this. Light sources emitting red, green, and blue light, for example, a red LED, a green LED, and a blue LED may be arranged, and an illumination light modulator may be provided for each light source. In this case, as the red LED, for example, semiconductor material such as AlGaAs (aluminum gallium arsenide), GaAsP (gallium arsenide phosphide), and InGaAsP (indium gallium arsenide phosphide) may be used. As the green LED, for example, semiconductor material such as InGaN (indium gallium nitride), GaN (gallium nitride), and AlGaN (aluminum gallium nitride) may be used. As the blue LED, for example, semiconductor material such as InGaN, GaN, and AlGaN may be used.

In the embodiment, the case where image lights of the three primary colors R, G, and B are generated from the light from the light source, and full-color image-display is performed is described. However, the present invention is not limited to this, and the light from the light source may be directly modulated and displayed as monochrome image. In this case, same effects as the present invention are also obtained.

The projection display described in the above embodiment is applicable to a front-type projection display or a rear-type projection display by appropriately adjusting the configurations of the screen and the projection optical system.

The present application contains subject matter related to that disclosed in Japanese Priority Patent Application JP 2008-110664 filed in the Japan Patent Office on Apr. 21, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection display comprising:
   a light source;
   a first light modulator modulating light from the light source on the basis of an input image signal, and generating a first image light;
   a second light modulator modulating the first image light on the basis of the image signal, and generating a second image light, the second modulator comprising:
   a liquid crystal panel modulating light on the basis of the image signal;
   a pair of polarizing plates provided on a light incident side and a light emitting side of the liquid crystal panel, respectively; and
   a wire-grid polarizing plate provided between the pair of polarizing plates,
   wherein the first image light passes through polarizing plate on the light incident side and passes through the wire-grid polarizing plate from the light incident side, and the second image light is emitted from the liquid crystal panel, reflected by the wire-grid polarizing plate, and passes through the polarizing plate on the light emitting side;

a signal processing unit receiving the image signal as an input and outputting a monochrome image signal to the first light modulator and a primary color image signal to the second light modulator; and a projection lens projecting the second image light generated with the second light modulator.

2. The projection display according to claim 1, wherein the first image light and the second image light form images substantially identical to each other, and the first light modulator and the second light modulator are driven in synchronization on the image signal.

3. The projection display according to claim 2, wherein the first image light is an illumination image light illuminating the second light modulator, and the second image light is a display image light.

4. The projection display according to claim 2, wherein the first light modulator generates the first image light by using a luminance component of the image signal, and the second light modulator generates the second image light by using a red image signal component, a green image signal component, and a blue image signal component of the image signal.

5. The projection display according to claim 2, wherein each of the first light modulator and the second light modulator includes a plurality of pixels two-dimensionally arranged, and a number of pixels in the first light modulator is equal to or less than a number of pixels in the second light modulator.

6. The projection display according to claim 2, wherein the first light modulator is arranged in a position optically conjugated to the second light modulator.

7. The projection display according to claim 2, wherein the first light modulator is arranged in a vicinity of the position optically conjugated to the second light modulator.

8. The projection display according to claim 2, wherein the first light modulator is arranged close to the second light modulator.

9. The projection display according to claim 2, wherein a light diffusion layer is provided on a light emitting side of the first light modulator.

10. The projection display according to claim 8, wherein each of the first light modulator and the second light modulator includes a plurality of pixels two-dimensionally arranged, and the number of pixels in the first light modulator is less than the number of pixels in the second light modulator.

11. The projection display according to claim 8, wherein the first light modulator and includes:

a liquid crystal panel modulating light on the basis of the image signal; and a pair of polarizing plates provided on a light incident side and a light emitting side of the liquid crystal panel, respectively, and the polarizing plate on the light emitting side of the first light modulator also serves as the polarizing plate on the light incident side of the second light modulator.

12. The projection display according to claim 2, wherein the light source is configured as a white light source, the light source including:

a color separation optical system separating the first image light of white color generated from the first light modulator into a plurality of color lights, and the second light modulator generates the second image light for display for each color light separated with the color separation optical system, and the second image lights of plurality of colors are blended and projected with the projection lens.

* * * * *